US012781831B2

(12) United States Patent
Booth

(10) Patent No.: US 12,781,831 B2
(45) Date of Patent: Nov. 3, 2026

(54) DOUBLE STACK LOCKING CLEAT

(71) Applicant: Panduit Corp., Tinley Park, IL (US)

(72) Inventor: Andrew W. Booth, Pickering (GB)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 19/227,720

(22) Filed: Jun. 4, 2025

(65) Prior Publication Data

US 2025/0297669 A1 Sep. 25, 2025

Related U.S. Application Data

(63) Continuation of application No. 18/420,049, filed on Jan. 23, 2024, now Pat. No. 12,372,138.

(51) Int. Cl.
*F16G 11/06* (2006.01)

(52) U.S. Cl.
CPC .................................... *F16G 11/06* (2013.01)

(58) Field of Classification Search
CPC .......... F16G 11/06; F16B 2/08; F16B 35/005; F16B 2/065; F16L 33/10; B65D 63/06; B65D 63/14; B65D 63/08; H02G 3/32
See application file for complete search history.

(56) References Cited

U.S. PATENT DOCUMENTS

| | | | |
|---|---|---|---|
| 193,946 A | 8/1877 | Hamilton | |
| 2,993,256 A | 7/1961 | Mühlegg | |
| 3,528,142 A | 9/1970 | Lodholm | |
| 3,754,303 A | 8/1973 | Pollock | |
| 4,473,925 A | 10/1984 | Jansen | |
| 4,570,303 A * | 2/1986 | Richmond ............ | F16B 21/071 24/17 AP |
| 4,646,393 A | 3/1987 | Young | |
| 5,488,760 A | 2/1996 | Jansen | |
| D399,414 S * | 10/1998 | Viklund .................. | H02G 3/32 D8/356 |
| 5,820,083 A * | 10/1998 | Geiger .................... | F16L 3/137 248/68.1 |
| 7,484,274 B2 | 2/2009 | Nelson et al. | |
| 7,650,680 B2 | 1/2010 | Stillings et al. | |
| 8,146,212 B2 | 4/2012 | Nelson et al. | |
| 8,424,166 B2 | 4/2013 | Dorneman et al. | |
| 8,635,745 B2 | 1/2014 | DeBerry et al. | |
| 8,991,774 B2 | 3/2015 | Hajduch | |
| 9,073,677 B2 | 7/2015 | Crouse | |
| 9,869,338 B2 | 1/2018 | Smith | |
| 10,400,917 B2 | 9/2019 | Kitago | |

(Continued)

FOREIGN PATENT DOCUMENTS

| | | |
|---|---|---|
| EP | 4144311 A1 | 3/2023 |
| WO | 2021055285 A1 | 3/2021 |

*Primary Examiner* — David M Upchurch
(74) *Attorney, Agent, or Firm* — Freda Li; Christopher S. Clancy; James H. Williams

(57) ABSTRACT

A locking cleat is designed to secure at least one cable. The locking cleat includes a housing, a strap, a threaded screw, and a nut. The housing has a top, a bottom, a front, a back, and sides. The housing has a lower aperture and an upper aperture defined by the top, the bottom, the front, the back, and the sides. The strap is positioned within the lower aperture of the housing. The nut is positioned within the upper aperture of the housing. The threaded screw is secured to the nut in the upper aperture of the housing.

16 Claims, 9 Drawing Sheets

(56) References Cited

U.S. PATENT DOCUMENTS

| | | | | |
|---|---|---|---|---|
| 10,479,572 | B2 | 11/2019 | De Vittori et al. | |
| 11,033,274 | B2 * | 6/2021 | Ho | A61B 17/12013 |
| 12,304,711 | B2 * | 5/2025 | Rouleau | B65D 63/08 |
| 2004/0076465 | A1 * | 4/2004 | Geiger | F16B 5/0685 403/278 |
| 2007/0056145 | A1 | 3/2007 | Stillings et al. | |
| 2014/0325799 | A1 * | 11/2014 | Frizzell | F16L 3/137 24/16 R |
| 2016/0123359 | A1 | 5/2016 | Coles et al. | |
| 2017/0096269 | A1 | 4/2017 | Marelin | |

* cited by examiner

DOUBLE STACK LOCKING CLEAT

CROSS REFERENCE TO RELATED APPLICATION(S)

This application is a continuation of U.S. patent application Ser. No. 18/420,049, filed Mar. 23, 2024, the entirety of which is hereby incorporated by reference herein.

FIELD OF THE INVENTION

The present invention relates to a locking cleat, and more particularly to a double stack locking cleat.

BACKGROUND OF THE INVENTION

Conventional cable cleats have been typically used to secure wire or cable bundles to panels, ladder racks, or similar structural support members. The cable cleats include a mounting surface and a body portion that receives the wires or a cable bundle. It is also known to use MS 75 strap cleats to secure cables for short circuit protection. While the known cleats provide desirable characteristics for certain applications, they still have drawbacks and are capable of improvement. Conventional cable cleats are generally difficult and time consuming to install.

It is desirable to provide an improved strap locking cleat solution for short circuit protection that is lower in cost and easier to install. It is also desirable to provide a strap locking cleat solution that is flexible and accommodates a range of cable sizes.

SUMMARY OF THE INVENTION

The invention is directed to a locking cleat secured to at least one cable. The locking cleat includes a housing, a strap, a threaded screw, and a nut. The housing has a top, a bottom, a front, a back, and sides. The housing also includes a lower aperture and an upper aperture. The strap is positioned within the lower aperture of the housing and the nut is positioned within the upper aperture of the housing. The threaded screw is positioned within the housing to engage the strap to secure the locking cleat on the at least one cable.

DETAILED DESCRIPTION

Figure 1:
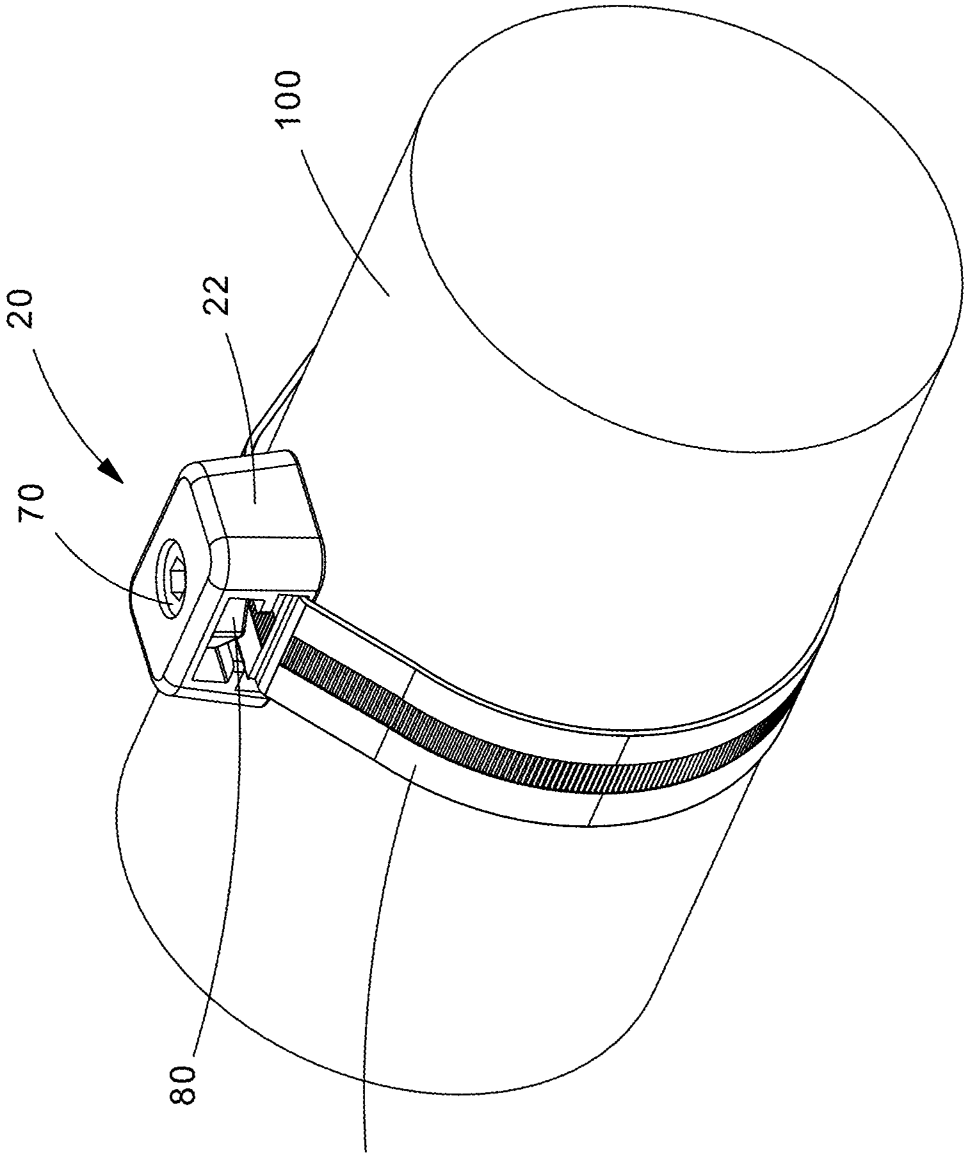
FIG. 1 is a perspective view of a double stack locking cleat of the present invention secured to a cable.
Figure 2:
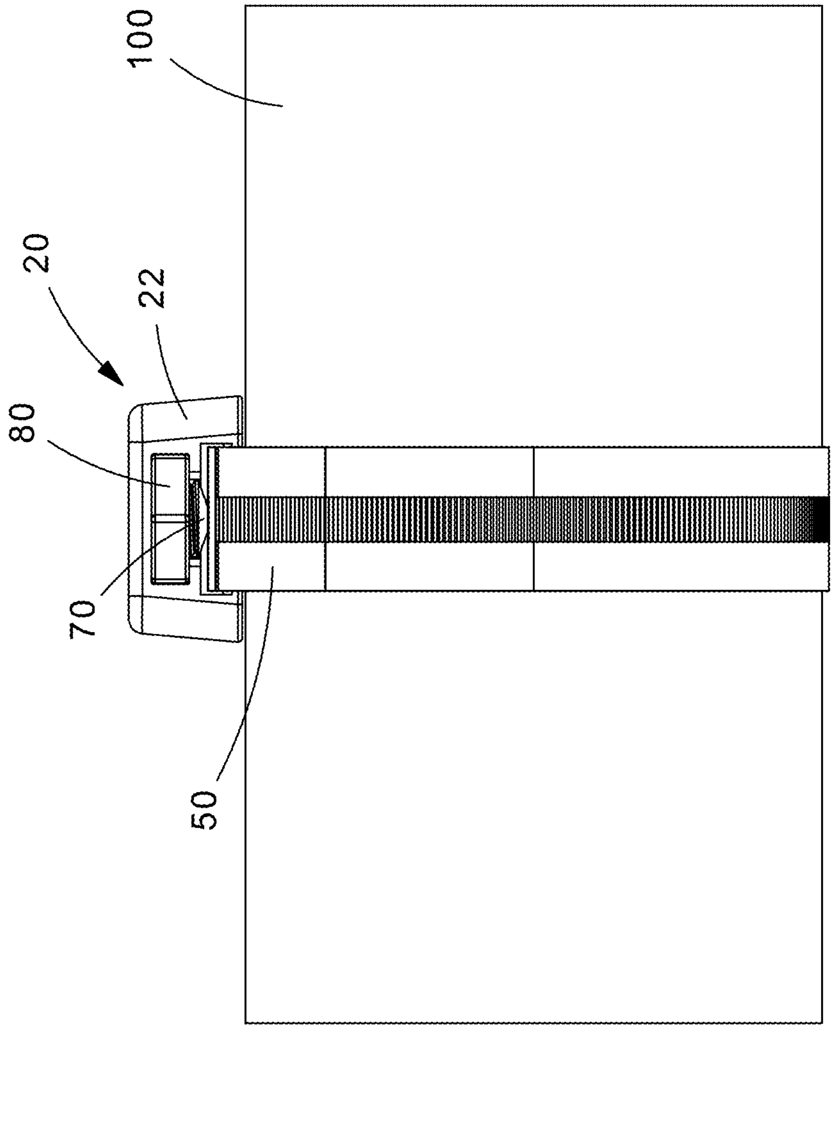
FIG. 2 is a front view of the double stack locking cleat of FIG. 1 secured to the cable.

FIGS. 1 and 2 illustrate the double stack locking cleat 20 of the present invention secured around a single cable 100.

Although the double stack locking cleat 20 is illustrated installed around a single cable 100, the double stack locking cleat 20 may also be installed around a bundle of cables.

Figure 3:
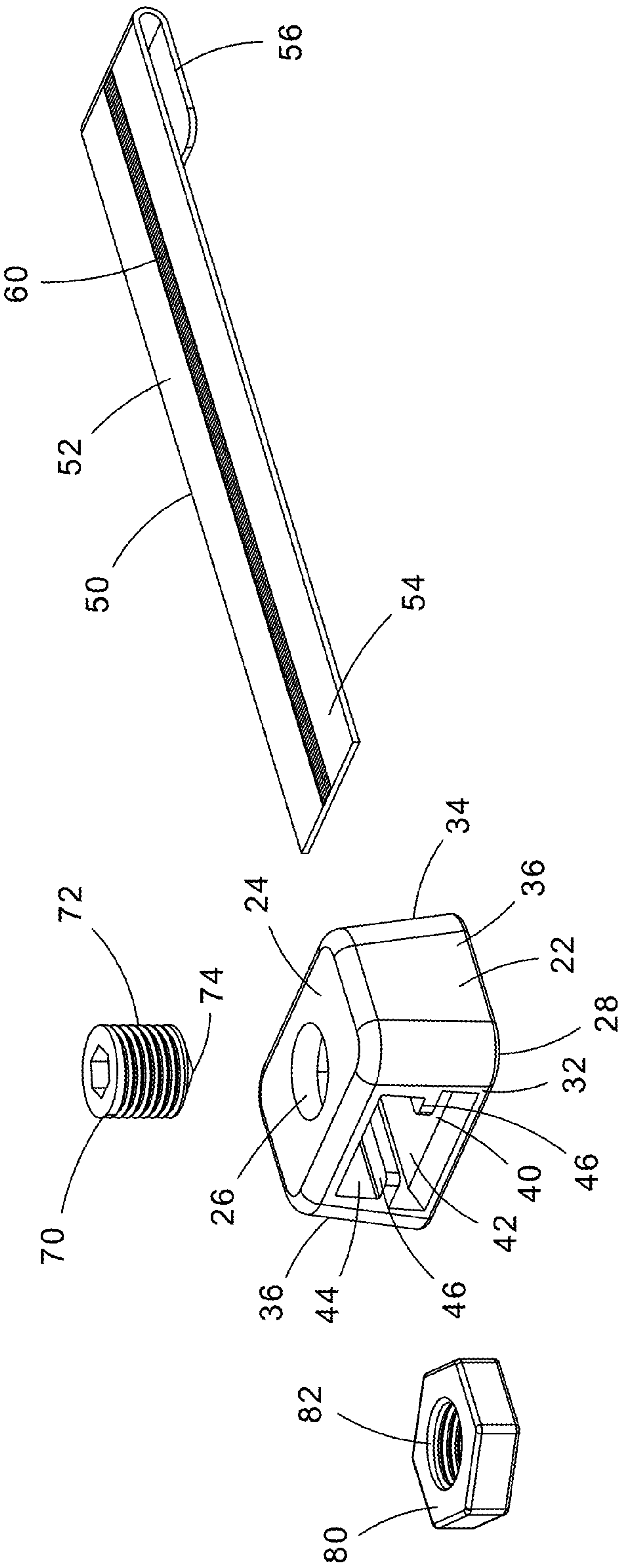
FIG. 3 is a top exploded view of the double stack locking cleat of FIG. 1.
Figure 4:
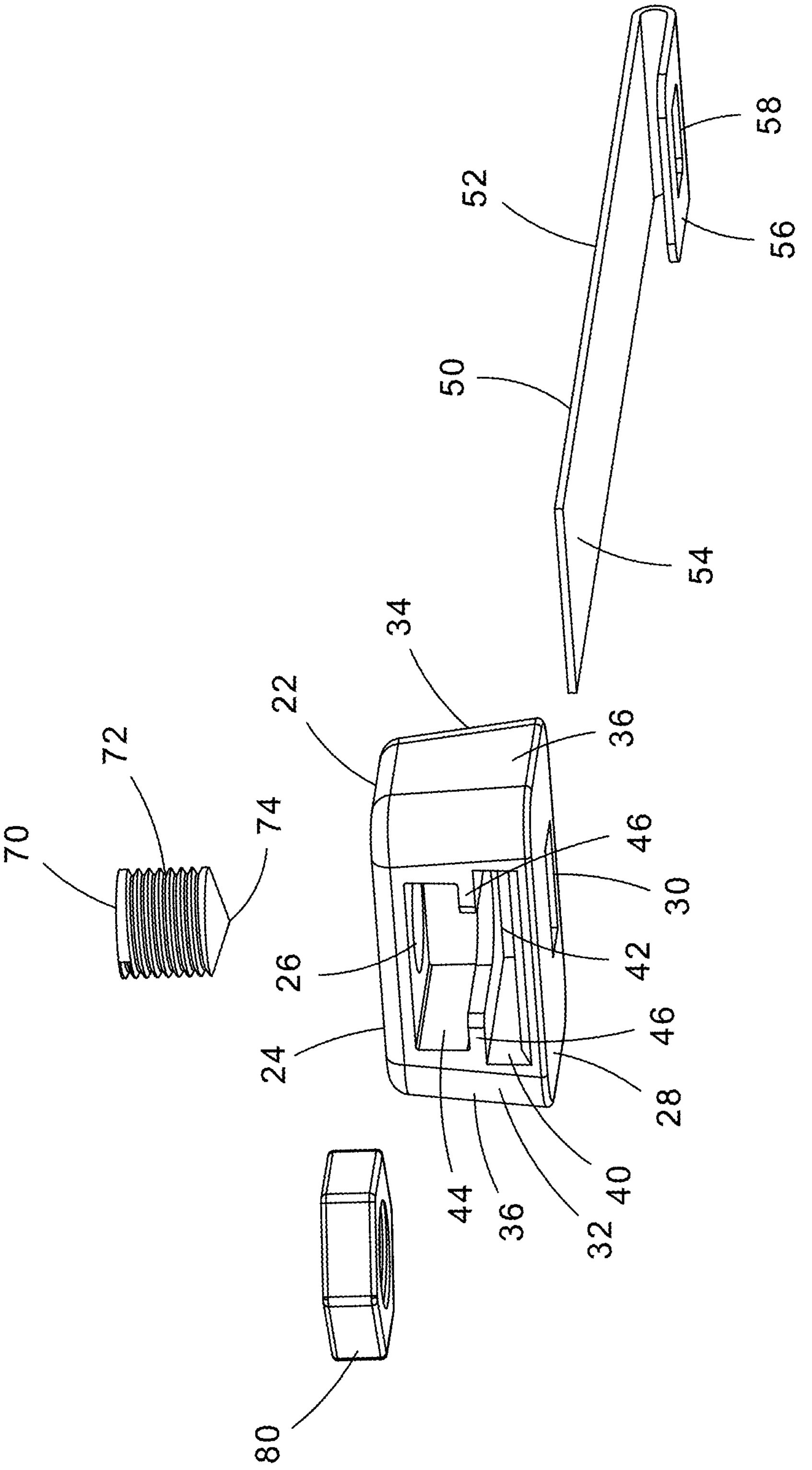
FIG. 4 is a bottom exploded view of the double stack locking cleat of FIG. 1.

FIGS. 3 and 4 illustrate the components of the double stack locking cleat 20. The double stack locking cleat 20 includes a housing 22, a strap 50, a threaded tapered screw 70, and a nut 80. The housing 22 is cast steel or aluminum or injection molded. The housing 22 includes a top 24, a bottom 28, a front 32, a back 34, and sides 36. The housing 22 also includes a lower aperture 40, an upper aperture 44, a circular hole 26 through the top 24, and a rectangular opening 30 through the bottom 28. The lower aperture 40 extends from the front 32 to the back 34 of the housing 22 defining a pathway 42 for the strap 50. The bottom front 32 of the housing 22 is angled to aid the wrapping of the strap 50 around the cable 100. The housing 22 also includes two internal arms 46 that extend from the sides 36 toward the center of the housing 22. The internal arms 46 separate the lower aperture 40 and the upper aperture 44.

The strap 50 includes a main body 52 with a first free end 54 and a second fold over end 56. The fold over end 56 includes a spring finger 58 positioned between the folded end 56 and the strap main body 52. The strap 50 also includes a continuous knurled recess 60 extending along the length of the strap 50.

The threaded tapered screw 70 includes threads 72 and a point 74 at one end and the nut 80 includes internal threads 82.

Figure 5:
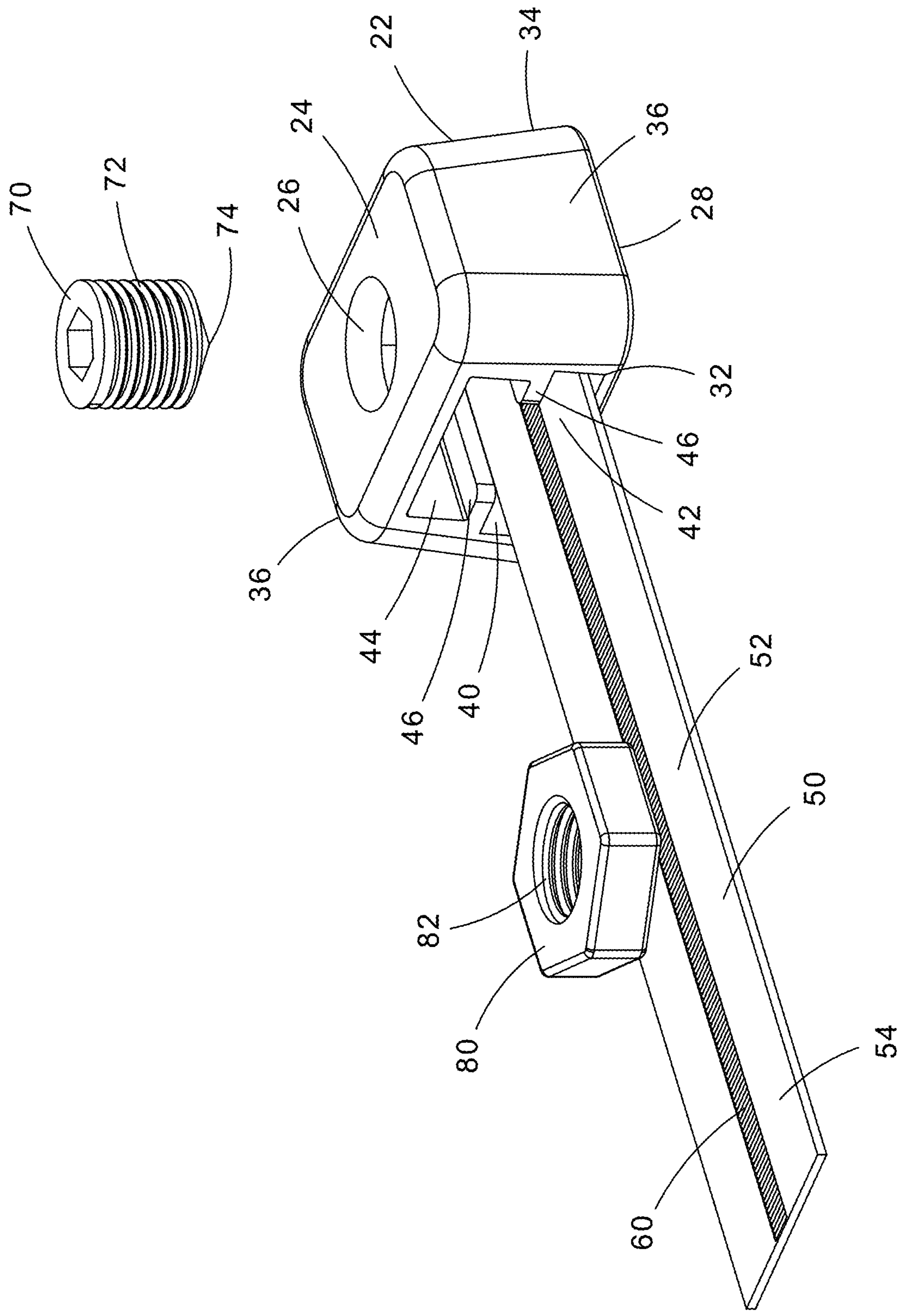
FIG. 5 is a partially exploded view of the double stack locking cleat of FIG. 3.
Figure 6:
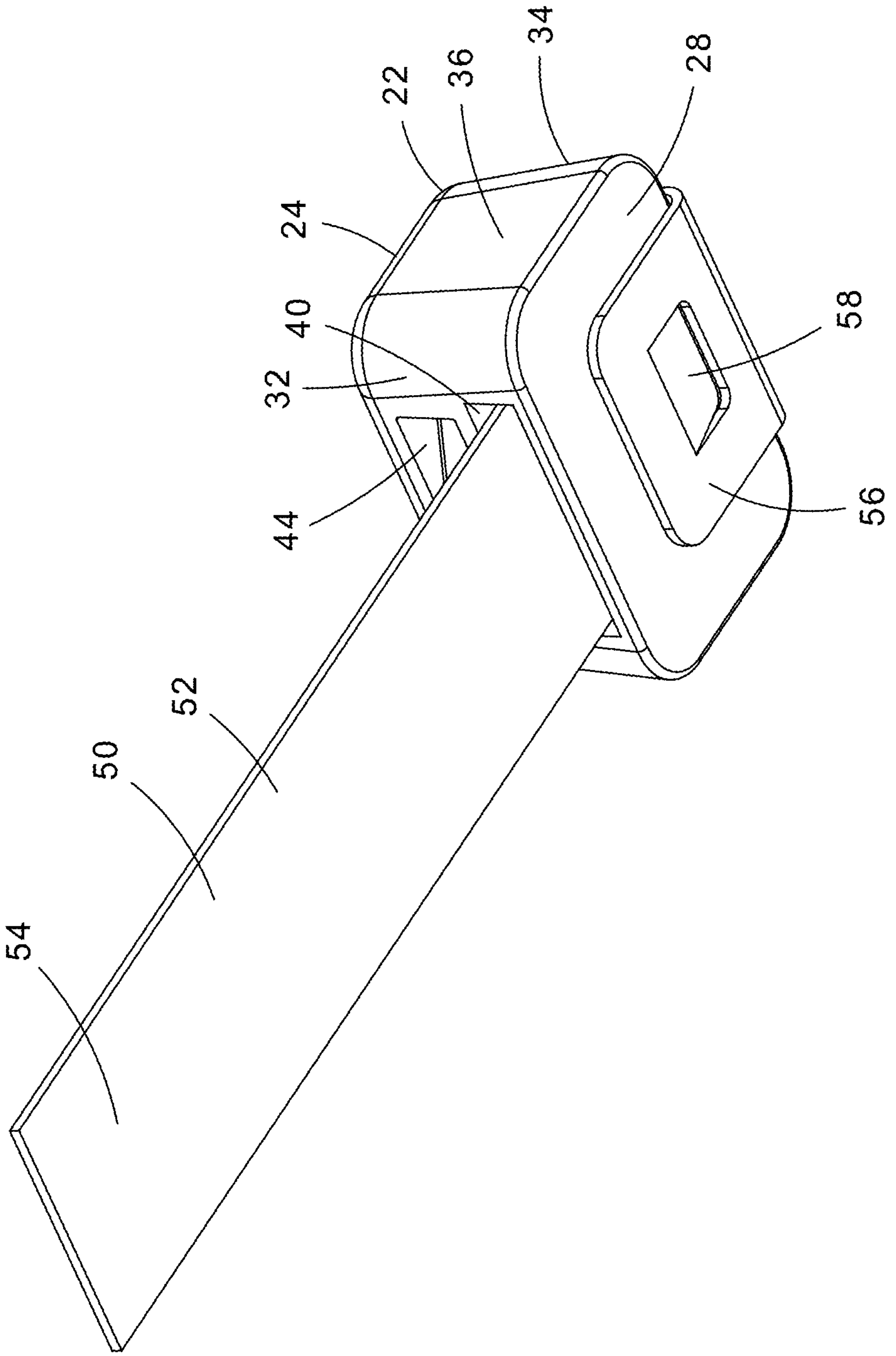
FIG. 6 is a bottom perspective view of the partially assembled double stack locking cleat of FIG. 5.

FIGS. 5-6 illustrate the strap 50 initially installed in the housing 22 of the locking cleat 20. The strap 50 is inserted through the lower aperture 40 sufficiently to clear the fold over end 56. Next, the strap 50 is pulled back on itself so the spring finger 58 engages the rectangular recess 30 in the bottom 28 of the housing 22.

Figure 7:
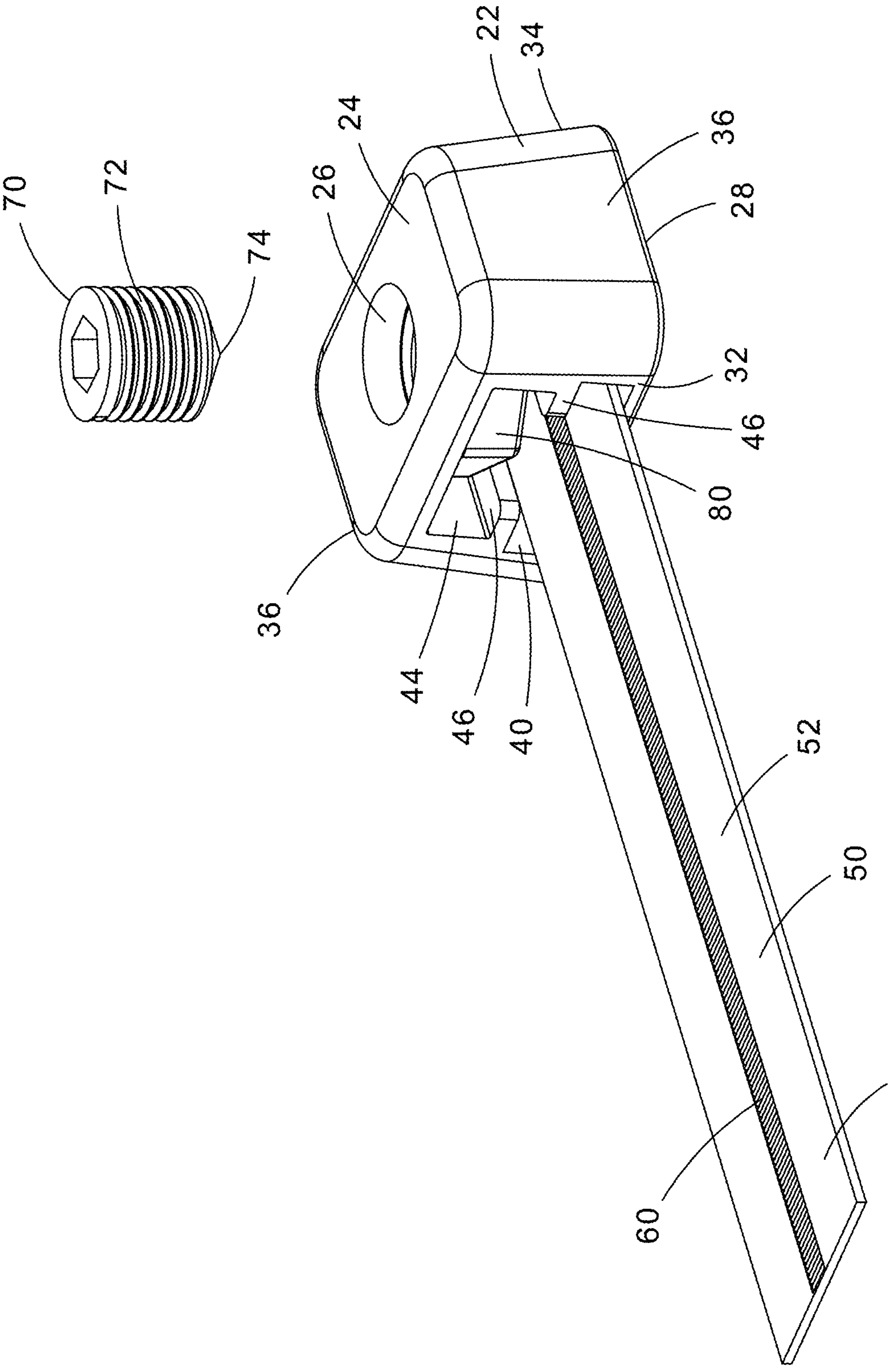
FIG. 7 is a partially exploded view of the double stack locking cleat of FIG. 5.
Figure 8:
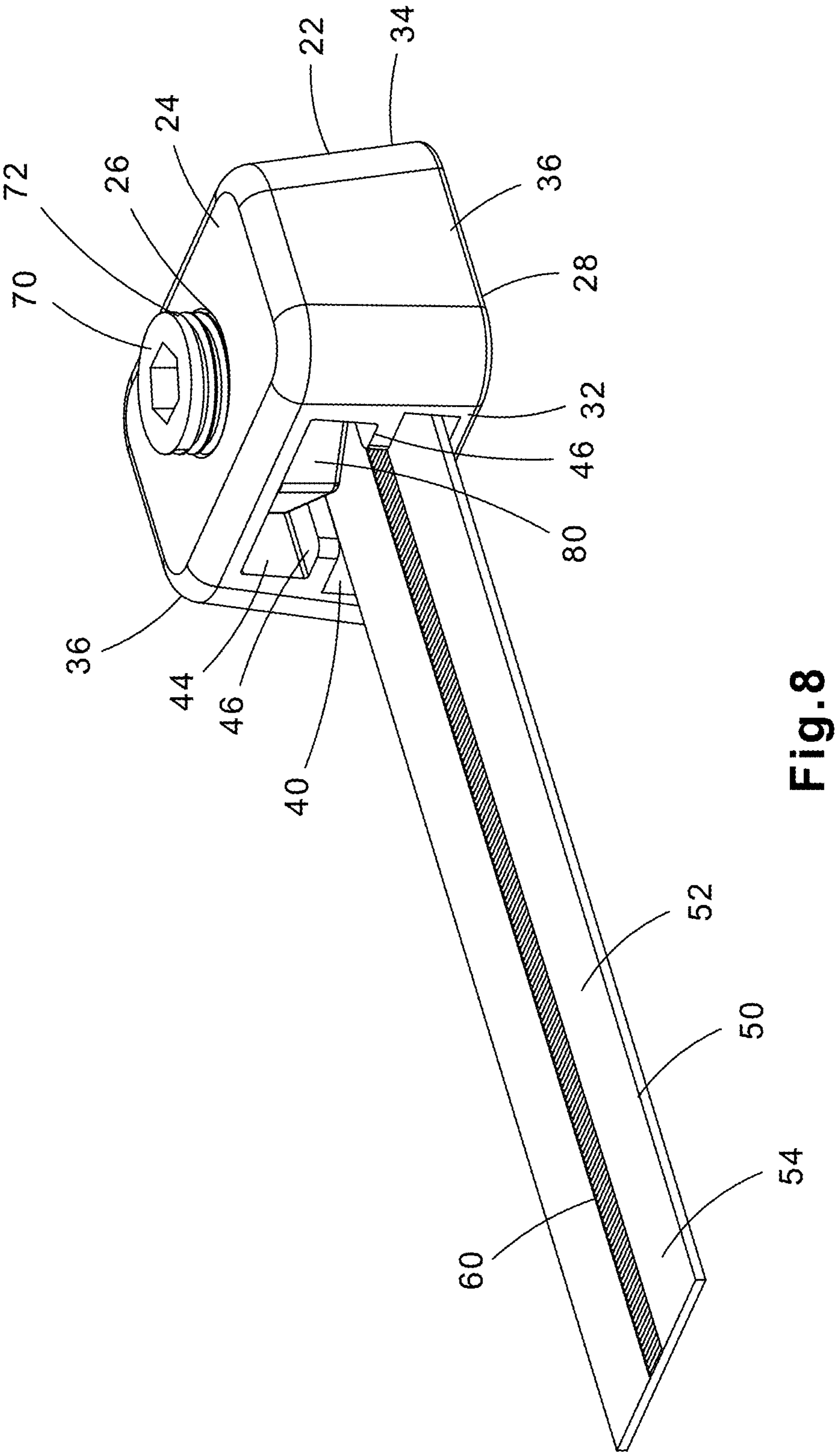
FIG. 8 is a perspective view of the assembled double stack locking cleat of FIG. 3.
Figure 9:
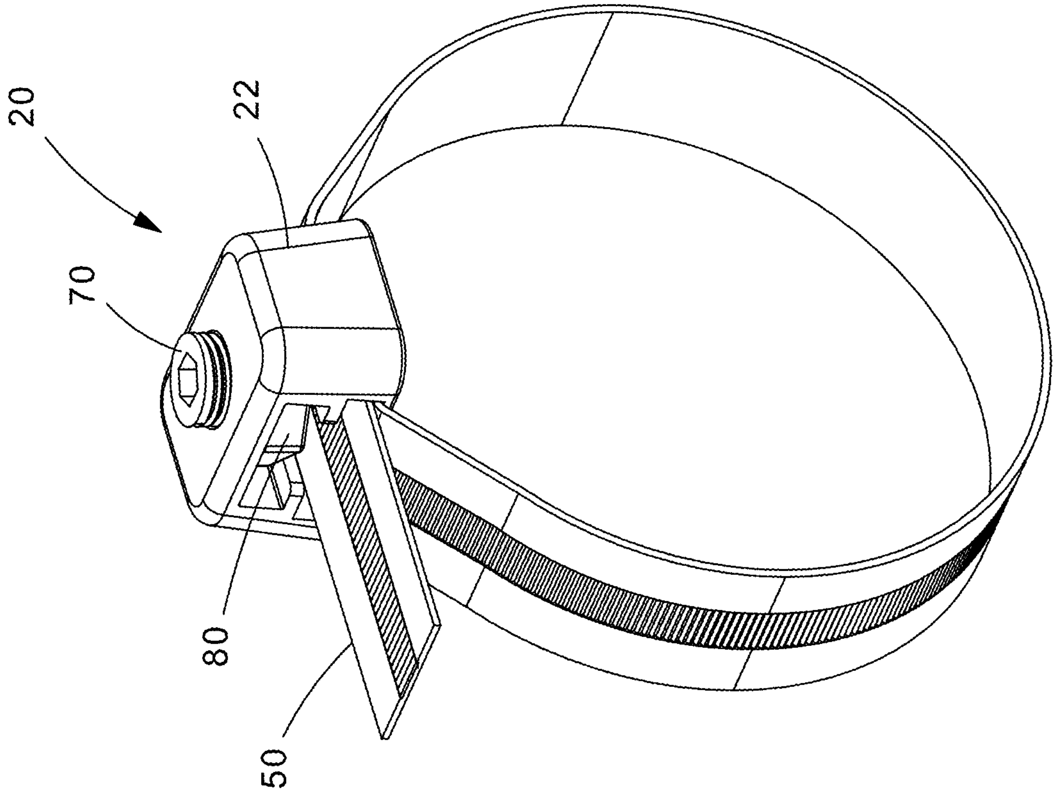
FIG. 9 is a perspective view of the double stack locking cleat of FIG. 8 with the strap fed through the housing of the locking cleat.

As illustrated in FIG. 7, the nut 80 is inserted into the upper aperture 44 of the housing 22 of the locking cleat 20. The nut 80 engages the back 34 of the housing 22 and is positioned on the internal arms 46 in the housing 22. The nut 80 is aligned with the circular hole 26 in the top of the housing 22. As illustrated in FIG. 8, the threaded tapered screw 70 is inserted through the circular hole 26 in the top 24 of the housing 22 of the locking cleat 20. The threaded tapered screw 70 is threaded into the nut 80 to secure the tapered screw 70.

To install the locking cleat 20, the strap 50 is wrapped around a cable 100 or a bundle of cables and then fed back through the lower aperture 40 in the housing 22 of the locking cleat 20. The strap 50 may be wrapped around the cable 100 or bundle of cables and feed through the lower aperture 40 once, twice or any number of times, as desired. After the strap 50 wrap around is complete, the strap 50 is tightened by using the appropriate hand tool, if necessary. Next, the threaded tapered screw 70 is fully tightened. The point 74 at the end of the screw 70 becomes positioned within one of the knurled recesses 60 extending along the strap 50. Once the threaded tapered screw 70 is tightened into the strap, the strap will not be able to release. After the strap 50 has been secured, the free end 54 of the strap is cut by a hand tool.

The double stack locking cleat of the present invention provides range taking options allowing the strap to be wrapped around various cable or cable bundle sizes. The double stack locking cleat is inexpensive to manufacture and install. The double stack locking cleat can be installed with common tools while wearing gloves. The double stack locking cleat may also be installed in confined spaces.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A locking cleat for securing at least one cable, the locking cleat comprising:

a housing with a top, a bottom, a front, a back, and sides, the housing has a lower aperture and an upper aperture defined by the top, the bottom, the front, the back and the sides;

a strap positioned within the lower aperture of the housing; and a nut positioned within the upper aperture of the housing.

2. The locking cleat of claim 1, wherein the top of the housing has a circular hole for receiving a fastener.

3. The locking cleat of claim 1, wherein the strap includes a spring finger and the bottom of the housing has a rectangular opening for receiving the spring finger of the strap.

4. The locking cleat of claim 1, wherein the lower aperture extends from the front to the back of the housing defining a pathway for the strap.

5. The locking cleat of claim 1, wherein the housing has internal arms extending from the sides toward a center of the housing.

6. The locking cleat of claim 5, wherein the internal arms separate the lower aperture from the upper aperture.

7. The locking cleat of claim 5, wherein the nut is positioned on the internal arms extending from the sides of the housing.

8. The locking cleat of claim 1, wherein the strap has a main body with a free end and a fold over end.

9. The locking cleat of claim 8, wherein the fold over end includes a spring finger positioned between the fold over end and the main body of the strap.

10. The locking cleat of claim 1, wherein the strap includes a continuous knurled recess extending along a length of the strap.

11. The locking cleat of claim 1, wherein the nut is positioned in the upper aperture of the housing such that the nut engages the back of the housing within the upper aperture.

12. A locking cleat wrapped around at least one cable, the locking cleat comprising:

a housing with a lower aperture and an upper aperture;

a strap positioned within the lower aperture of the housing; the lower aperture extends from a front to a back of the housing defining a pathway for the strap; and a nut positioned within the upper aperture of the housing;

whereby the strap wraps around a cable and is threaded back through the lower aperture in the housing.

13. The locking cleat of claim 12, wherein the strap has a main body with a free end and a fold over end, the fold over end includes a spring finger positioned between the fold over end and the main body of the strap.

14. The locking cleat of claim 12, wherein the housing has internal arms extending from sides of the housing toward a center of the housing; wherein the internal arms separate the lower aperture from the upper aperture, and wherein the nut is positioned on the internal arms extending from the sides of the housing.

15. The locking cleat of claim 12, wherein a top of the housing has a circular hole for receiving a fastener.

16. The locking cleat of claim 12, wherein the strap includes a spring finger and a bottom of the housing has a rectangular opening for receiving the spring finger of the strap.

* * * * *